(Model.)
W. S. SHIPE.
CHAIN SAW.
No. 325,364. Patented Sept. 1, 1885.
Fig 1.
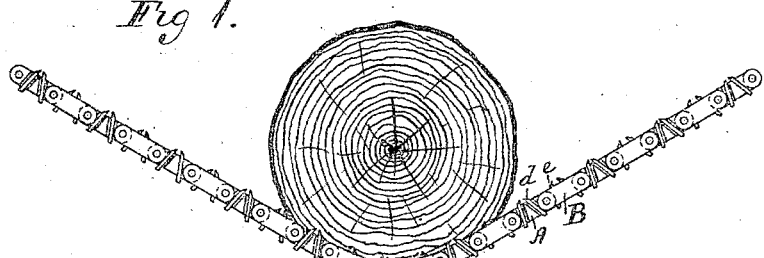
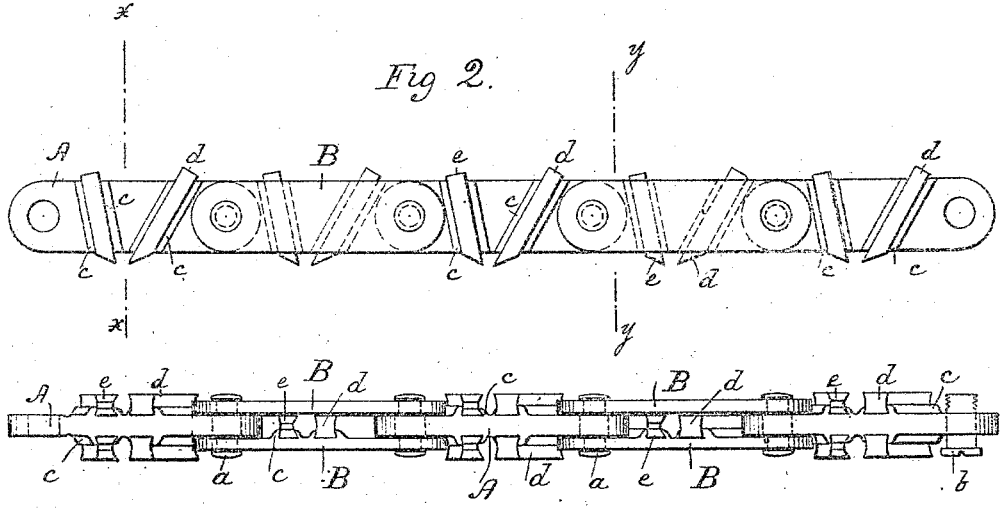
Fig 2.
Fig 3
Fig 4. 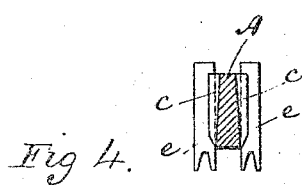 Fig. 6.  Fig 5. 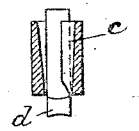
WITNESSES:
J. Cook
Chas. Lucott
INVENTOR:
Walter S. Shipe
BY Munn & Co.
ATTORNEYS.

UNITED STATES PATENT OFFICE.

WALTER S. SHIPE, OF MINERVA, OHIO.

CHAIN-SAW.

SPECIFICATION forming part of Letters Patent No. 325,364, dated September 1, 1885.

Application filed September 16, 1884. (Model.)

*To all whom it may concern:*

Be it known that I, WALTER S. SHIPE, of Minerva, in the county of Stark and State of Ohio, have invented a new and Improved Sawing-Machine, of which the following is a full, clear, and exact description.

The object of my invention is to provide a machine that can be used for felling trees and cutting logs; and it consists in a chain-saw provided with cutting and clearing teeth, for operation as hereinafter described and claimed.

Reference is to be had to the accompanying drawings, forming a part of this specification, in which similar letters of reference indicate corresponding parts in all the figures.

Figure 1 is a side view of the sawing-machine as applied in cutting a log. Fig. 2 is a side view, and Fig. 3 is an edge view, of the chain in larger size. Fig. 4 is a cross-section on the line $x\ x$, and Fig. 5 a cross-section on the line $y\ y$, Fig. 2. Fig. 6 is a detailed perspective view of one of the teeth.

The chain is composed of a series of single links, A, and double links B B, which are jointed together by shouldered rivets $a$ at their ends, so as to form a chain of the length required. At $b$ is shown a screw, which connects the links and allows ready disconnection of the same, so that the chain may be shortened when a long chain is not required. The links of the chain are fitted with cutters that are dovetailed so as to pass between the lugs $c$, formed in the sides of the links, in an inclined direction. The cutters $e$ are for freeing the wood at the ends of the chip, while $d\ d$ are bits or cutters for plowing out the chips. Each link A is provided with one of the cutters $d$, and also with one of the cutters $e$, at each side, those at each side being set reversely inclined, as shown, and between the double links B is one of each of the cutters $d\ e$. The cutters or bits are slightly curved lengthwise upon the front and back edges, and are made of metal of such temper that they will have the requisite amount of yield or flexibility as to permit them to straighten as they are subjected to pressure upon said front and back edges from the walls of their seats, so that when driven into their seats they will bind tightly, and thus be held securely in place. By this arrangement of the two sets of cutters on the links the material which is left in the kerf by the set on one link, is displaced by the other, and instead of the material being dragged out under the links, it passes directly outward between the sides of the double links B and at the sides of the links A in the kerf. The links as shown in Figs. 4 and 5, are formed beveling or narrower upon their back edges, so as to allow the chips to pass out freely without lodging or wedging.

This sawing-machine is to be operated either by horse or steam power, and is drawn across the log or tree at about the angle shown, according to the character of the wood and the amount of power applied, more power being required when the angle is increased. The team or power is attached at one end of the chain, while the middle portion and the other end of the chain are supported by helpers who will carry the chain in a manner to give the required tension and to cause cutting to be made the full depth of the teeth. The chain should be long enough to fell a tree or cross-cut the same by once drawing across, although two or more passes may be made.

It will not be understood from anything that has been herein stated that I make claim, broadly, to a cutter with a hardened cutting-edge and a soft or yielding shank.

Having thus described my invention, I claim as new and desire to secure by Letters Patent—

1. In a sawing-machine, the combination, with the links, of the teeth or cutters, each slightly curved longitudinally and having side flanges flared laterally, or converging toward the body of the tooth and fitting into corresponding sockets of the links, substantially as and for the purpose set forth.

2. In a sawing-machine, the combination, with the links, of the cutting and clearing teeth disposed in divergent planes at the same angle of inclination, with their lower acting edges disposed toward each other, substantially as and for the purpose set forth.

3. In a sawing-machine, the alternately-connected single and parallel plates, in combination with the teeth disposed in pairs between said parallel plates and upon the sides of the single plates in divergent planes at the same angle of inclination, with their lower acting edges disposed toward each other, substantially as and for the purpose set forth.

WALTER S. SHIPE.

Witnesses:
MONROE M. SHIPE,
R. V. LOTZ.